United States Patent [19]

Park

[11] Patent Number: 5,266,842
[45] Date of Patent: Nov. 30, 1993

[54] CHARGE PUMP CIRCUIT FOR A SUBSTRATE VOLTAGE GENERATOR

[75] Inventor: Chan-Jong Park, Suwon, Rep. of Korea

[73] Assignee: SamSung Electronics Co., Ltd., Paldal

[21] Appl. No.: 924,747

[22] Filed: Aug. 4, 1992

[30] Foreign Application Priority Data

Oct. 25, 1991 [KR] Rep. of Korea ............ 91-18834

[51] Int. Cl.$^5$ ............................................. G05F 3/16
[52] U.S. Cl. ...................... 307/296.2; 307/264; 307/296.8
[58] Field of Search ............ 307/296.2, 296.8, 264

[56] References Cited

U.S. PATENT DOCUMENTS

| 2,930,027 | 3/1960 | Aylward et al. | 307/364 |
| 4,766,415 | 8/1988 | Dielacher | 307/296.8 |
| 4,794,278 | 12/1988 | Vajdic | 307/296.2 |
| 4,982,118 | 1/1991 | Lloyd | 307/362 |
| 5,029,282 | 7/1991 | Ito . | |
| 5,036,229 | 7/1991 | Tran | 307/296.2 |
| 5,126,590 | 6/1992 | Chern . | |
| 5,132,555 | 7/1992 | Takahashi | 307/296.8 |
| 5,157,278 | 10/1992 | Min et al. | 307/296.8 |
| 5,212,415 | 5/1993 | Murakami et al. | 307/296.2 |

Primary Examiner—John T. Kwon
Attorney, Agent, or Firm—Robert E. Bushnell

[57] ABSTRACT

A charge pump circuit of a substrate voltage generator used for a semiconductor memory device, comprising a first transistor whose channel is connected between a first pumping capacitor and a substrate node and a second transistor whose channel is connected between a second pumping capacitor and the substrate node, whereby a negative voltage generated by the first pumping capacitor in response to the substrate voltage and clock signals turns on the second transistor which performs charge pumping from the substrate node. Thus the substrate voltage is made to have sufficient coupling-down so as to stabilize the substrate voltage even with a low source voltage.

18 Claims, 3 Drawing Sheets

CHARGE PUMP CIRCUIT FOR A SUBSTRATE VOLTAGE GENERATOR

BACKGROUND OF THE INVENTION

The present invention relates to a substrate voltage generator used in a semiconductor memory device, and more particularly to a charge pump circuit for providing the substrate with a negative voltage.

Generally, the substrate voltage generator is used in a semiconductor memory device, to stabilize the threshold voltages of MOS transistors and to prevent the occurrence of parasitic transistors as well as malfunctioning due to the undershoot of source signals. Specifically, it is well-known in this technical field that in a NMOS transistor comprising a p-type substrate and n-type channel if a negative voltage is applied to the substrate, it is possible to prevent occurrence of parasitic transistors and stabilize the threshold voltage.

Referring to FIG. 1 for schematically illustrating the system of a substrate voltage generator, if the substrate voltage ($V_{BB}$) 50 is in an undesirable level, the detector 10 detects the level to regulate the oscillator 20. Then signals generated by the oscillator drive a drive circuit 30 of the charge pump circuit 40 to convert the $V_{BB}$ of a substrate rode 50 to a desired level. The present invention is directed to the charge pump circuit 40.

In a conventional charge pump circuit of the substrate voltage generator as shown in FIG. 2, the charge pump circuit is driven by the signals CLKI to CLK4 so as to discharge current from the substrate ground, thus dropping the substrate voltage. In this case, when the voltage of n22 (n25) is dropped to the minimum $-V_{cc}$ ($V_{cc}$ being the source voltage) by means of M22 (M25) driven by the CLK2 (CLK3), the voltage of n21 (n26) is also dropped to only $-V_{cc}$ by means of M21 (M26) driven by the CLK1 (CLK4), and therefore the $V_{BB}$ may not be dropped below the minimum $-V_{cc}-V_{TP}$ (Here, $V_{TP}$ is the threshold voltage of M27, usually about 1.0V). Hence this conventional circuit has a low pumping capability with a low $V_{CC}$ so as not to provide a stabilized substrate voltage.

SUMMARY OF THE INVENTION

It is an object of the present invention to provide a substrate voltage generator with an enhanced charge pumping capability, whereby a stabilized substrate voltage is generated especially with a low external source voltage.

According to the present invention, a substrate voltage generator, which comprises an oscillation circuit for producing square waves of a given frequency, drive circuit for receiving the square waves to produce clock signals CLKI to CLK4 of square waves and substrate node $V_{BB}$ for transferring a given substrate voltage, is provided with a charge pump circuit comprising:

(a) a first pumping capacitor M1 with one electrode connected to the CLKI signal;
(b) a second pumping capacitor M2 with one electrode connected to the CLK2 signal;
(c) a third pumping capacitor M3 with one electrode connected to the CLK3 signal;
(d) a fourth pumping capacitor M4 with one electrode connected to the CLK2 signal;
(e) a fifth pumping capacitor M5 with one electrode connected to the CLK3 signal;
(f) a sixth pumping capacitor M6 with one electrode connected to the CLK4 signal;
(g) a first transistor M11 with a gate connected to the other electrode of the fifth pumping capacitor M5 and a channel formed between the other electrode of the first pumping capacitor M1 and the substrate node $V_{BB}$;
(h) a second transistor M14 with a gate connected to the other electrode of the second pumping capacitor M2 and a channel formed between the other electrode of the sixth pumping capacitor M6 and the substrate node $V_{BB}$; and
(i) a circuit connected between the other electrodes of the pumping capacitors and the substrate node $V_{BB}$, for making the voltage of the substrate node $V_{BB}$ have a negative value.

BRIEF DESCRIPTION OF THE ATTACHED DRAWINGS

For a better understanding of the invention and to show how the same may be carried into effect, reference will now be made, by way of example, to the accompanying diagrammatic drawings, in which:

FIG. 1 is a block diagram for illustrating the system of a substrate voltage generator;

FIG. 2 schematically shows a conventional charge pump circuit;

FIG. 3 schematically shows a charge pump circuit according to the present invention;

FIG. 4 is a timing diagram for illustrating the input clock pulses in the inventive circuit; and FIG. 5 is a graph for illustrating the set-up characteristics of $V_{BB}$ of the inventive circuit compared to the conventional circuit, when $V_{CC}=1.5V$.

DETAILED DESCRIPTION OF CERTAIN PREFERRED EMBODIMENTS

Figure 1:
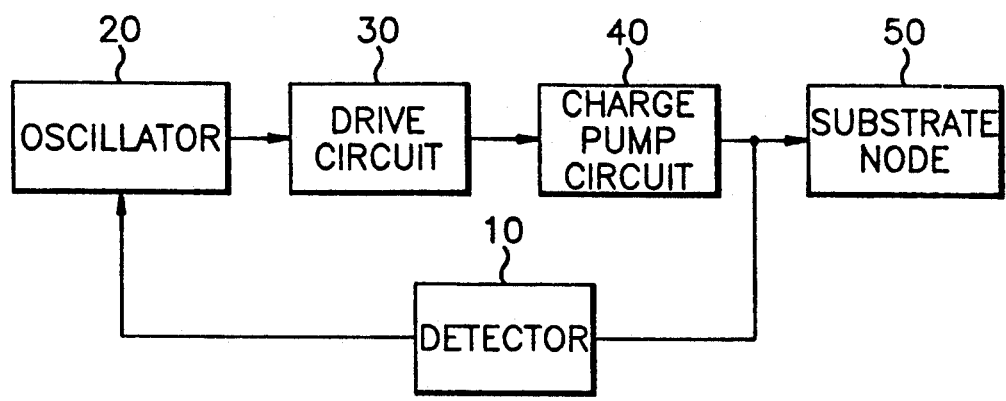
Figure 2:
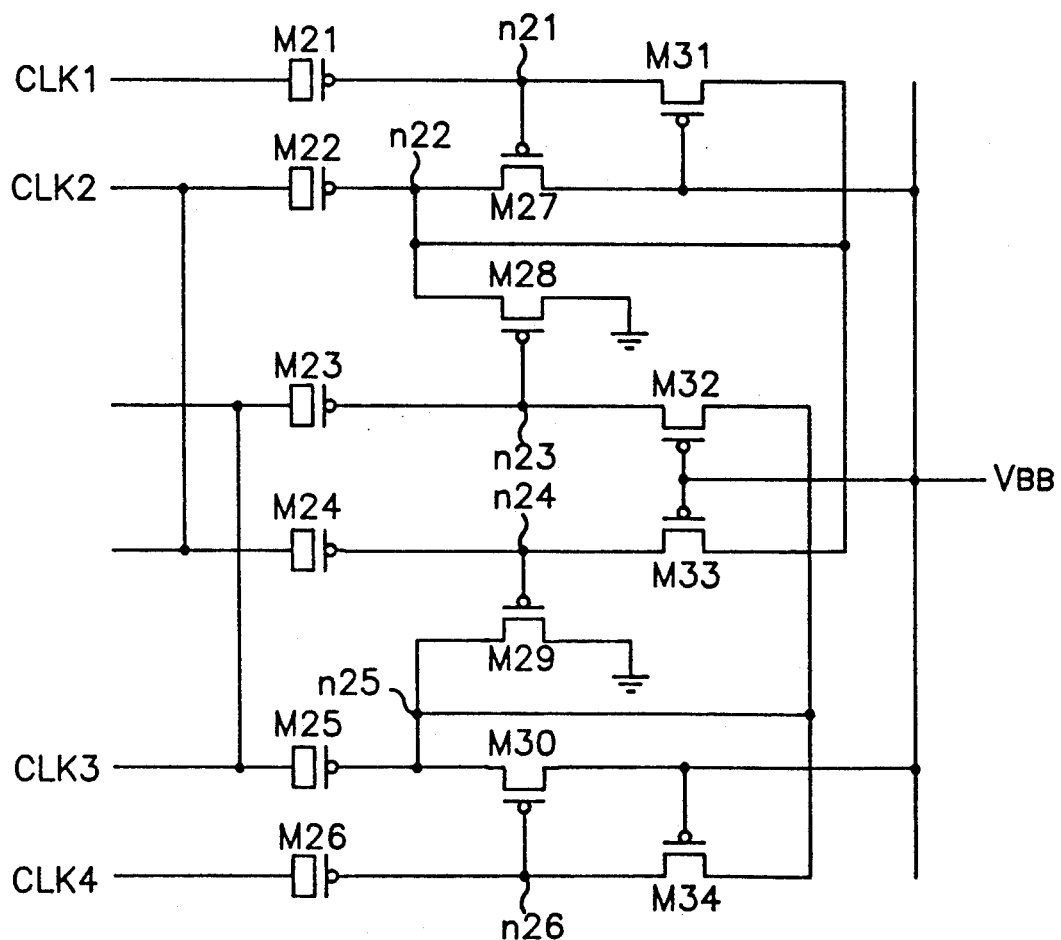
Figure 3:
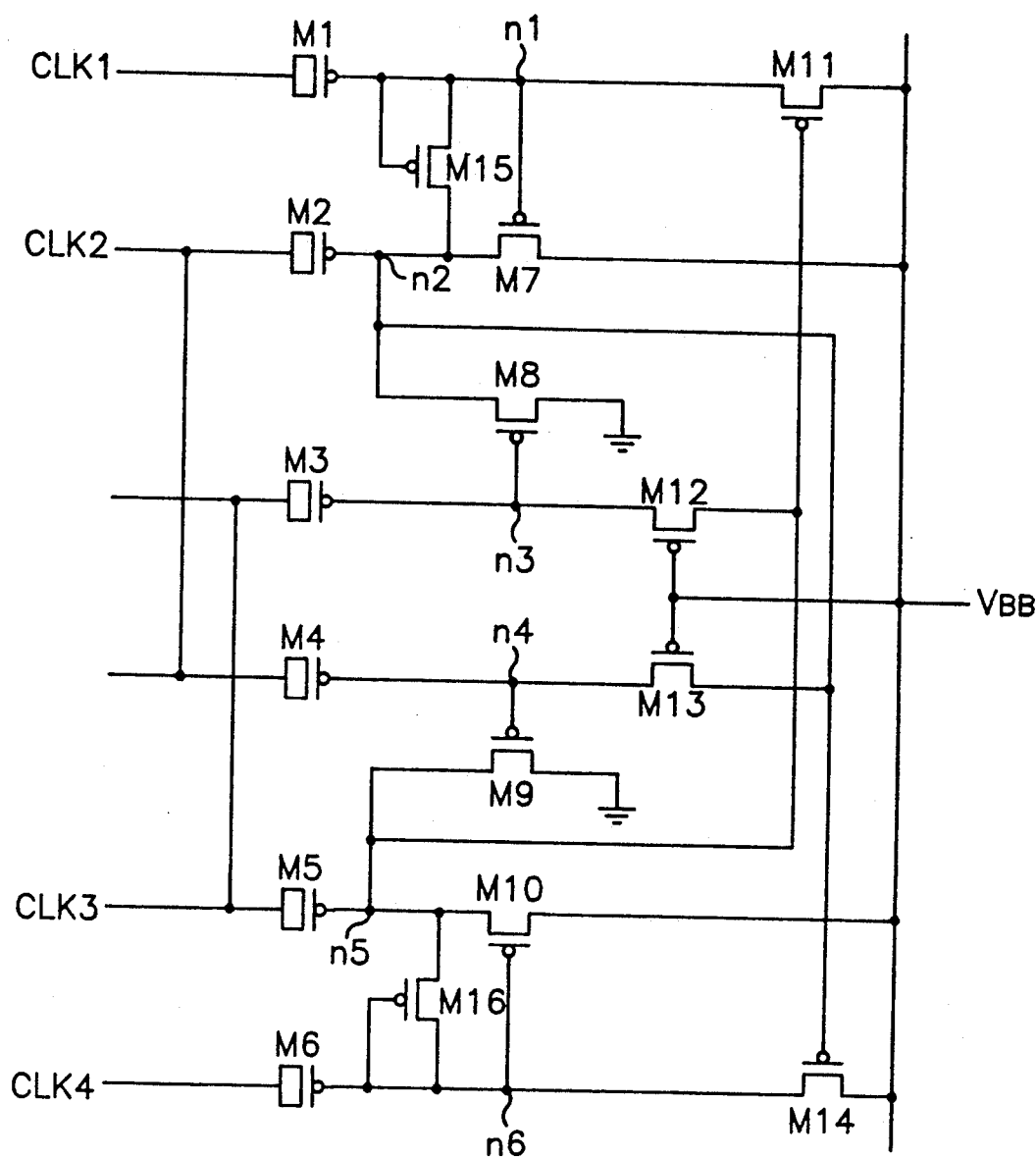

Referring to FIG. 3, one electrode of a first pumping capacitor M1 is connected to the CLKI signal, that of a second pumping capacitor M2 to the CLK2 signal, that of a third pumping capacitor M3 to the CLK3 signal, that of a fourth pumping capacitor M4 to the CLK2 signal, that of a fifth pumping capacitor M5 to the CLK3 signal, and that of a sixth pumping capacitor M6 to the CLK4 signal. A first transistor M11 has a gate connected to the other electrode of the fifth pumping capacitor M5 and a channel formed between the other electrode of the first pumping capacitor M1 and the substrate node ($V_{BB}$) A second transistor M14 has a gate connected to the other electrode of the second pumping capacitor M2 and a channel formed between the other electrode of the sixth pumping capacitor M6 and the substrate node $V_{BB}$. Also provided is a circuit connected between the other electrodes of the pumping capacitors and the substrate node $V_{BB}$ for making the voltage of the substrate node $V_{BB}$ have a negative value.

The circuit for making the voltage of the substrate node $V_{BB}$ have a negative value comprises third to tenth transistors M7, M8, M9, M10, M12, M13, M15, and M16. The third transistor M7 has a gate connected to the other electrode of the first pumping capacitor M1 and a channel formed between the other electrode of the second pumping capacitor M2 and the substrate node $V_{BB}$. The fourth transistor M8 has a gate connected to the other electrode of the third pumping capacitor M3 and a channel formed between the other electrode of the second pumping capacitor M2 and ground. The fifth transistor M9 has a gate connected to the other electrode of the fourth pumping capacitor M4 and a channel formed between the other electrode of the fifth pumping capacitor M5 and ground. The sixth transistor M10 has a gate connected to the other electrode of the sixth pumping capacitor M6 and a channel formed between the other electrode of the fifth pumping capacitor M5 and the substrate node $V_{BB}$. A seventh transistor M12 has a gate connected to the substrate node $V_{BB}$ and a channel formed between the other electrodes of the third and fifth pumping capacitors M3 and M5. An eighth transistor M13 has a gate connected to the substrate node $V_{BB}$ and a channel formed between the other electrodes of the second and fourth pumping capacitors M2 and M4. The ninth transistor M15 has a gate connected to the other electrode of the first pumping capacitor M1 and a channel formed between the other electrodes of the first and second pumping capacitors M1 and M2. The tenth transistor M16 has a gate connected to the other electrode of the sixth pumping capacitor M6 and a channel formed between the other electrodes of the fifth and sixth pumping capacitors M5 and M6. Here the essential point of the present invention consists in the circuit connection of the terminals of the transistors M11 and M14.

Figure 4:
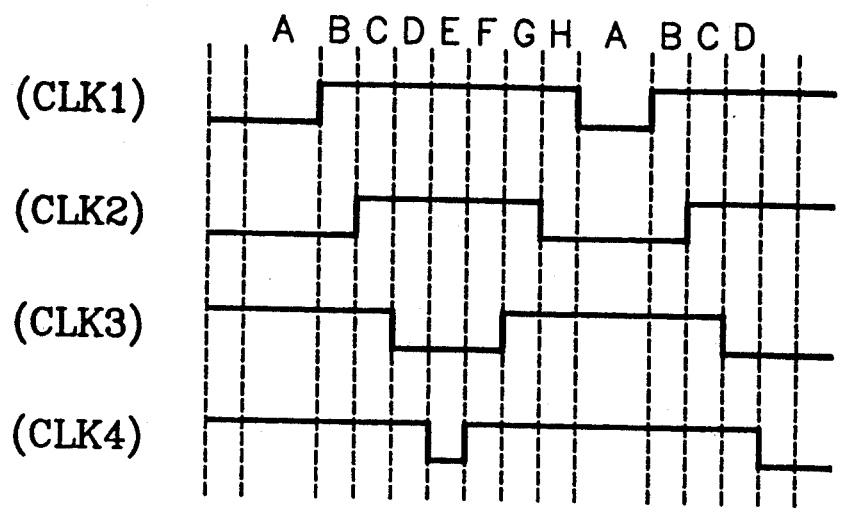

Hereinafter, the operation of the charge pump circuit according to the present invention will now be described with reference to FIG. 4. The circuit of FIG. 3 is driven by the clock signals CLK1 to CLK4 as shown in FIG. 3.

In the timing interval A, the voltage of node n1 is $-V_{CC}+V_{TP}$, so that the third transistor M7 is turned on. Hence, a current flows from the substrate node $V_{BB}$ to make node n2 have a voltage of the substrate node $V_{BB}$. Meanwhile, node n6 is pre-charged with voltage $V_{TP}$ via the second transistor M14 and node n5 is discharged via the fifth transistor M9 to have the ground voltage.

In the timing interval B, the first clock CLK1 is changed from 0V to $V_{CC}$, so that the voltage of node n1 is changed to $V_{TP}$ to turn off the third transistor M7. Then the second clock CLK2 is changed from 0V to $V_{CC}$ in the timing interval C, thus making the voltage of the node n2 have $V_{BB}+V_{CC}$. If the third CLK3 is changed from $V_{CC}$ to 0V in the timing interval D, the voltage of the node n2 is discharged via the fourth transistor M8 to ground voltage, and the voltage of the node n5 is changed to $-V_{CC}$. In the timing interval E, the fourth clock CLK4 is changed from $V_{CC}$ to 0V to make the voltage of the node n6 have $-V_{CC}+V_{TP}$, thus completely turning on the sixth transistor M10 so as to change the voltage of the node n5 to $V_{BB}$. In addition, the fourth clock CLK4 is changed from 0V to $V_{CC}$ so as to change the voltage of the node n6 to $V_{TP}$, thus turning off the sixth transistor M10, in the timing interval F. In the timing interval G, the third clock CLK3 is changed from 0V to $V_{CC}$ so as to change the voltage of the node n5 from $V_{BB}$ to $V_{BB}+V_{CC}$. Further, in timing interval H the second clock CLK2 is changed from $V_{CC}$ to 0V so as to change the voltages of the nodes n2 and n4 to $V_{CC}$, thus turning on the fifth transistor M9. Hence the voltage of the node n5 is discharged to ground voltage, so that the charge pump circuit performs the charge pumping twice during a period.

Figure 5:
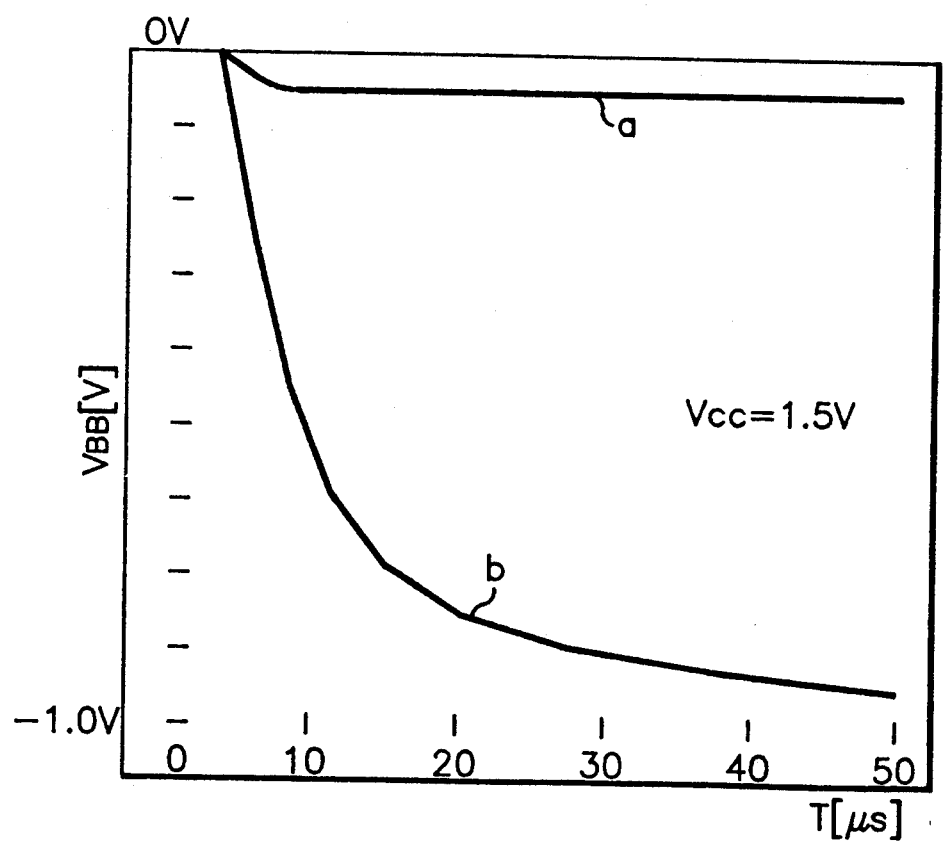

While the conventional circuit does not lower the voltages of n21 and n26 below the minimum $-V_{CC}$ and therefore the voltage of the $V_{BB}$ node below $-V_{CC}-V_{TP}$, the inventive circuit lowers the voltages of n1 and n6 down to the minimum $-V_{CC}+V_{TP}$ and therefore the voltage of the $V_{BB}$ node down to the minimum $-V_{CC}$ so as to provide a stabilized $V_{BB}$ level even in a low $V_{CC}$. Furthermore, as shown in FIG. 5, the inventive circuit (b) works quickly to make the $V_{BB}$ have a desired negative voltage as contrasted with a conventional circuit, (a). In both the conventional circuit (a) and the inventive circuit (b) the source voltage $V_{CC}$ is 1.5V and the input clock period is 0.5 $\mu$s.

As stated above, the present invention enhances the charge pumping capability, so that the substrate voltage is stabilized even in a lower level of the source voltage at which the semiconductor devices work as well as reducing the power consumption in stand-by.

What is claimed is:

1. A charge pump circuit of a substrate voltage generating means comprising an oscillation circuit for producing square waves of a given frequency, drive circuit for receiving said square waves to produce a first to fourth clock signals of square waves and substrate node for transferring a given substrate voltage, said charge pump circuit comprising:

a first pumping capacitor with one electrode connected to said first clock signal;

a second pumping capacitor with one electrode connected to said second clock signal;

a third pumping capacitor with one electrode connected to said third clock signal;

a fourth pumping capacitor with one electrode connected to said second clock signal;

a fifth pumping capacitor with one electrode connected to said third signal;

a sixth pumping capacitor with one electrode connected to said fourth clock signal;

a first transistor with a gate connected to the other electrode of said fifth pumping capacitor and a channel formed between the other electrode of said first pumping capacitor and said substrate node;

a second transistor with a gate connected to the other electrode of said second pumping capacitor and a channel formed between the other electrode of said sixth pumping capacitor and said substrate node; and means connected between the other electrodes of said first to sixth pumping capacitors and said substrate node for making the voltage of said substrate node have a negative value.

2. A charge pump circuit as claimed in claim 1, wherein said means for making the voltage of said substrate node have a negative value comprises:

a third transistor with a gate connected to the other electrode of said first pumping capacitor and a channel formed between the other electrode of said second pumping capacitor and said substrate node;

a fourth transistor with a gate connected to the other electrode of said third pumping capacitor and a channel formed between the other electrode of said second pumping capacitor and ground;

a fifth transistor with a gate connected to the other electrode of said fourth pumping capacitor and a channel formed between the other electrode of said fifth pumping capacitor and ground;

a sixth transistor with a gate connected to the other electrode of said sixth pumping capacitor and a channel formed between the other electrode of said fifth pumping capacitor and said substrate node;

a seventh transistor with a gate connected to said substrate node and a channel formed between the other electrodes of said third and fifth pumping capacitors;

an eighth transistor with a gate connected to said substrate node and a channel formed between the other electrodes of said second and fourth pumping capacitors;

a ninth transistor with a gate connected to the other electrode of said first pumping capacitor and a channel formed between the other electrodes of said first and second pumping capacitors; and a tenth transistor with a gate connected to the other electrode of said sixth pumping capacitor and a channel formed between the other electrodes of said fifth and sixth pumping capacitors.

3. A charge pump circuit as claimed in claim 2, wherein each of said pumping capacitors and transistors is a PMOS transistor.

4. A charge pump circuit, which is connected to a drive circuit for receiving a square waves from an oscillating circuit to produce a first to fourth clock signals of square waves, having a first pumping capacitor with one electrode connected to said first clock signal, a second pumping capacitor with one electrode connected to said second clock signal, a third pumping capacitor with one electrode connected to said third clock signal, a fourth pumping capacitor with one electrode connected to said second clock signal, a fifth pumping capacitor with one electrode connected to said third clock signal, and a sixth pumping capacitor with one electrode connected to said fourth clock signal, said charge pump circuit comprising:

a substrate node for transferring a given substrate voltage;

a first transistor with a gate connected to the other electrode of said fifth pumping capacitor and a channel formed between the other electrode of said first pumping capacitor and said substrate node;

a second transistor with a gate connected to the other electrode of said second pumping capacitor and a channel formed between the other electrode of said sixth pumping capacitor and said substrate node; and a third transistor with a gate connected to the other electrode of said first pumping capacitor and a channel formed between the other electrode of said second pumping capacitor and said substrate node;

a fourth transistor with a gate connected to the other electrode of said third pumping capacitor and a channel formed between the other electrode of said second pumping capacitor and ground;

a fifth transistor with a gate connected to the other electrode of said fourth pumping capacitor and a channel formed between the other electrode of said fifth pumping capacitor and ground;

a sixth transistor with a gate connected to the other electrode of said sixth pumping capacitor and a channel formed between the other electrode of said fifth pumping capacitor and said substrate node;

a seventh transistor with a gate connected to said substrate node and a channel formed between the other electrodes of said third and fifth pumping capacitors; and an eighth transistor with a gate connected to said substrate node and a channel formed between the other electrodes of said second and fourth pumping capacitors;

5. A charge pump circuit as claimed in claim 4, further comprising:

a ninth transistor with a gate connected to the other electrode of said first pumping capacitor and a channel formed between the other electrodes of said first and second pumping capacitors; and a tenth transistor with a gate connected to the other electrode of said sixth pumping capacitor and a channel formed between the other electrodes of said fifth and sixth pumping capacitors.

6. A charge pump circuit as claimed in claim 5, wherein each of said pumping capacitors and transistors is a PMOS transistor.

7. In a substrate voltage generator comprising an oscillator circuit for producing square waves of a given frequency; a drive circuit for receiving said square waves to produce first clock signals second clock signals, third clock signals, and fourth clock signals; and a substrate node for transferring a substrate voltage; a charge pump comprising:

a first pumping capacitor having a first electrode connected to receive said first clock signals;

a second pumping capacitor having a first electrode connected to receive said second clock signals;

a third pumping capacitor having a first electrode connected to receive said third clock signals;

a fourth pumping capacitor having a first one electrode connected to receive said second clock signals;

a fifth pumping capacitor having a first electrode connected to receive said third signals;

a sixth pumping capacitor having a first electrode connected to receive said fourth clock signals;

a first transistor having a gate connected to a second electrode of said fifth pumping capacitor and a channel formed between a second electrode of said first pumping capacitor and said substrate node;

a second transistor having a gate connected to a second electrode of said second pumping capacitor and a channel formed between a second electrode of said sixth pumping capacitor and said substrate node; and means connected between said first pumping capacitor, said second pumping capacitor, said third pumping capacitor, said fourth pumping capacitor, said fifth pumping capacitor, said sixth pumping capacitor, and said substrate node for providing a negative voltage to said substrate node.

8. A charge pump circuit as claimed in claim 7, wherein said means for providing said negative voltage comprises:

a third transistor having a gate connected to said second electrode of said first pumping capacitor and a channel formed between said second electrode of said second pumping capacitor and said substrate node; and a fourth transistor having a gate connected to a second electrode of said third pumping capacitor and a channel formed between said second electrode of said second pumping capacitor and a reference voltage terminal.

9. A charge pump circuit as claimed in claim 8, wherein said means for providing said negative voltage further comprises:

a fifth transistor having a gate connected to a second electrode of said fourth pumping capacitor and a channel formed between said second electrode of said fifth pumping capacitor and said reference voltage terminal; and a sixth transistor having a gate connected to said second electrode of said sixth pumping capacitor and a channel formed between said second electrode of said fifth pumping capacitor and said substrate node.

10. A charge pump circuit as claimed in claim 9, wherein said means for providing said negative voltage further comprises:
   a seventh transistor having a gate connected to said substrate node and a channel formed between said second electrode of said third pumping capacitor and said second electrode of said fifth pumping capacitor; and
   an eighth transistor having a gate connected to said substrate node and a channel formed between said second electrode of said second pumping capacitor and said second electrode of said fourth pumping capacitor.

11. A charge pump circuit as claimed in claim 10, wherein said means for providing said negative voltage further comprises:
   a ninth transistor having a gate connected to said second electrode of said first pumping capacitor and a channel formed between said second electrode of said first pumping capacitor and said second electrode of said second pumping capacitor; and
   a tenth transistor having a gate connected to said second electrode of said sixth pumping capacitor and a channel formed between said second electrode of said fifth pumping capacitor and said second electrode of said sixth pumping capacitor.

12. A charge pump circuit as claimed in claim 8, wherein each of said pumping capacitors is formed from a p-channel metal oxide semiconductor transistor.

13. A charge pump circuit as claimed in claim 8, wherein each of said transistors is a p-channel metal oxide semiconductor transistor.

14. A charge pumping circuit comprising:
   a first pumping capacitor having a first electrode connected to receive a first clock signals;
   a second pumping capacitor having a first electrode connected to receive second clock signals;
   first means for connecting a second electrode of said second pumping capacitor to a reference voltage in response to third clock signals;
   second means for connecting a second electrode of said first pumping capacitor a substrate node; and
   third means for connecting said second electrode of said second pumping capacitor to said substrate node in response to a voltage of said second electrode of said first pumping capacitor.

15. A charge pumping circuit a claimed in claim 14, wherein said second means connects said second electrode of said first pumping capacitor to said substrate node in response to said third clock signals.

16. A charge pumping circuit comprising:
   first means comprising a first pumping capacitor having a first electrode connected to receive first clock signals, said first means or generating voltage signals at a second electrode of said first pumping capacitor by equalizing said second electrode with a substrate voltage before voltage transitions of said first clock signals;
   a second pumping capacitor having a first electrode connected to receive second clock signals, for generating a pumping voltage at a second electrode in response to voltage transitions of said second clock signals; and
   second means for connecting said second electrode of said second pumping capacitor to a substrate node in response to said voltage signals.

17. A charge pumping circuit as claimed in claim 16, further comprising means for equalizing said second electrode of said second pumping capacitor means with a reference voltage in response to third clock signals before said voltage transitions of said second clock signals.

18. A method for charge pumping in semiconductor device, said method comprising:
   generating a charge pumping voltage at a second electrode of a first pumping capacitor in response to voltage transitions of first clock signals received at a first electrode of said first pumping capacitor; and
   generating a transistor gate voltage at a first electrode of a second pumping capacitor by equalizing said first electrode of said second pumping capacitor with a substrate voltage before voltage transitions of second clock signals received at a second electrode of said second pumping capacitor, said transistor gate voltage for turning on a transistor connecting said first electrode of said first pumping capacitor to a substrate node.

* * * * *

UNITED STATES PATENT AND TRADEMARK OFFICE
CERTIFICATE OF CORRECTION

PATENT NO. : 5,266,842
DATED : November 30, 1993
INVENTOR(S) : Chan-Jong Park

It is certified that error appears in the above-indentified patent and that said Letters Patent is hereby corrected as shown below:

| | | |
|---|---|---|
| Column 1, | line 27, | after "substrate", change "rode" to --node--; |
| | line 31, | after "signals", change "CLKI" to --CLK1--; |
| | line 41, | after "about", change "1.0V" to -- -1.0V--; |
| | line 55, | after "signals", change "CLKI" to --CLK1--; |
| | line 60, | before "signal", change "CLKI" to --CLK1--; |
| Column 2, | line 39, | before "signal", change "CLKI" to --CLK1--; |
| Column 3, | line 28, | after "signals", change "CLKI" to --CLK1--; |
| | line 60, | after "to", change "$V_{cc}$" to -- -$V_{cc}$--; |

UNITED STATES PATENT AND TRADEMARK OFFICE
CERTIFICATE OF CORRECTION

PATENT NO. : 5,266,842
DATED : November 30, 1993
INVENTOR(S) : Chan-Jong Park

It is certified that error appears in the above-indentified patent and that said Letters Patent is hereby corrected as shown below:

IN THE CLAIMS

Column 8,   line 7,    before "claimed", change " a " to --as--;

line 14,   before "generating", change "or" to --for--:

Signed and Sealed this

Twentieth Day of August, 1996

Attest:

BRUCE LEHMAN

*Attesting Officer*       *Commissioner of Patents and Trademarks*